US012020543B2

(12) United States Patent
Marks

(10) Patent No.: US 12,020,543 B2
(45) Date of Patent: *Jun. 25, 2024

(54) GAMING MACHINE WITH RETAINED BONUS GAME CONDITIONS

(71) Applicant: Aristocrat Technologies Australia Pty Limited, North Ryde (AU)

(72) Inventor: Daniel Marks, Decatur, GA (US)

(73) Assignee: ARISTOCRAT TECHNOLOGIES AUSTRALIA PTY LIMITED, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/977,631

(22) Filed: Oct. 31, 2022

(65) Prior Publication Data

US 2023/0045805 A1 Feb. 16, 2023

Related U.S. Application Data

(63) Continuation of application No. 16/022,253, filed on Jun. 28, 2018, now Pat. No. 11,488,448.

(51) Int. Cl.
*G07F 17/34* (2006.01)
*G07F 17/32* (2006.01)

(52) U.S. Cl.
CPC ...... *G07F 17/3267* (2013.01); *G07F 17/3244* (2013.01); *G07F 17/34* (2013.01)

(58) Field of Classification Search
CPC ... G07F 17/3267; G07F 17/3244; G07F 17/34
USPC ............................................................ 463/16
See application file for complete search history.

(56) References Cited

U.S. PATENT DOCUMENTS 8,360,851 B2 1/2013 Aoki
8,393,958 B2 3/2013 Cohen
9,424,720 B2 8/2016 Suda
9,928,691 B2 3/2018 Olive
11,488,448 B2 * 11/2022 Marks .................... G07F 17/34
2003/0027622 A1 2/2003 Osawa
2003/0216165 A1 11/2003 Singer
2004/0048646 A1 3/2004 Visocnik
2004/0137982 A1 7/2004 Cuddy
2004/0259628 A1 * 12/2004 Randall .............. G07F 17/3288 463/20

(Continued)

OTHER PUBLICATIONS

Office Action dated Jun. 16, 2020 for U.S. Appl. No. 16/022,253 (pp. 1-13).

(Continued)

*Primary Examiner* — Jay Trent Liddle
*Assistant Examiner* — Ryan Hsu
(74) *Attorney, Agent, or Firm* — McAndrews, Held & Malloy, Ltd.

(57) ABSTRACT

An electronic gaming machine enables implementation of a base game, from which a bonus game may be triggered. Outcomes achieved during a play of the bonus game may be retained for use during subsequent triggering of the bonus game. For example, during play of the bonus game a player may achieve one or more game conditions, such as held special symbols, sticky WILD symbols, or award multipliers. These game conditions may be retained at the end of the bonus game and used if the player subsequently triggers another bonus game while playing the base game.

20 Claims, 16 Drawing Sheets

(56) References Cited

U.S. PATENT DOCUMENTS

| | | | | |
|---|---|---|---|---|
| 2006/0116194 | A1 | 6/2006 | Pacey | |
| 2006/0189369 | A1 | 8/2006 | Taylor | |
| 2008/0076519 | A1 | 3/2008 | Chim | |
| 2009/0239634 | A1 | 9/2009 | Nguyen | |
| 2010/0234092 | A1 | 9/2010 | Gomez | |
| 2011/0092271 | A1* | 4/2011 | Nguyen | G07F 17/3211 463/43 |
| 2012/0178517 | A1 | 7/2012 | Montenegro | |
| 2014/0274292 | A1 | 9/2014 | Suda | |
| 2014/0274316 | A1 | 9/2014 | Elias | |
| 2014/0323198 | A1 | 10/2014 | Tuck | |
| 2015/0348355 | A1 | 12/2015 | Caputo | |
| 2016/0042597 | A1* | 2/2016 | Olive | G07F 17/3262 463/21 |
| 2017/0154498 | A1 | 6/2017 | Olive | |
| 2018/0268655 | A1 | 9/2018 | Olive | |
| 2019/0385407 | A1 | 12/2019 | Hiten | |

OTHER PUBLICATIONS

Office Action dated Nov. 30, 2020 for U.S. Appl. No. 16/022,253 (pp. 1-19).
Office Action dated Mar. 23, 2021 for U.S. Appl. No. 16/022,253 (pp. 1-9).
Office Action (Final Rejection) dated Oct. 1, 2021 for U.S. Appl. No. 16/022,253 (pp. 1-11).
Office Action (Notice of Allowance and Fees Due (PTOL-85)) dated Jun. 9, 2022 for U.S. Appl. No. 16/022,253 (pp. 1-8).
Australian Examination Report No. 1 issued in App. No. AU2019204302, dated Mar. 9, 2024, 6 pages.

* cited by examiner

GAMING MACHINE WITH RETAINED BONUS GAME CONDITIONS

RELATED APPLICATIONS

The present application is a continuation of U.S. patent application Ser. No. 16/022,253, filed Jun. 28, 2018, the disclosure of which is incorporated herein by reference in its entirety.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are, therefore, highly regulated. Upon initiation of play, the RNG randomly determines a game outcome and symbols are then selected which correspond to that outcome. Notably, some games may include an element of skill on the part of the player and are, therefore, not entirely random.

In existing gaming systems, feature games may be triggered for players in addition to the base game. A feature game gives players an additional opportunity to win prizes, or the opportunity to win larger prizes, than would otherwise be available in the base game. Feature games can also offer altered game play to enhance player enjoyment.

The popularity of such gaming machines with players is heavily dependent on the entertainment value of the machine relative to other gaming options. Operators of gaming businesses therefore strive to provide the most entertaining, engaging, and exciting machines to attract customers to use the machines and increase profitability to the operator. Accordingly, there is a continuing need for gaming machine manufacturers to develop new games in order to maintain or increase player enjoyment.

SUMMARY

Aspects of the present disclosure relate to gaming machines and electronic gaming methods in which a bonus game may be triggered during play of a base game. According to certain aspects of the present disclosure, outcomes achieved during a play of the bonus game may be retained for use during subsequent triggering of the bonus game. For example, during play of the bonus game, a player may achieve one or more game conditions, such as held special symbols, sticky WILD symbols, or award multipliers. These game conditions may be retained at the end of the bonus game and used if the player subsequently triggers another bonus game while playing the base game.

An embodiment provides a method of wagering on an electronic gaming machine, comprising: receiving a wager input by a player on the electronic gaming machine; deducting from a credit balance established by the player on the electronic gaming machine, conducting an instance of a base game in response to receipt of the wager input; and conducting a bonus game in response to occurrence of a triggering condition in connection with the base game. If a retained bonus conditions exists, the bonus game is conducted using the retained bonus condition. Otherwise, the bonus game is conducted using a default condition.

In some embodiments, the retained bonus condition may be a persistent function symbol, such as a WILD symbol, that is retained on a display matrix for a predetermined number of instances of the bonus game. In some embodiments, the retained bonus condition may be an outcome multiplier. In some embodiments, the retained bonus condition comprises a display matrix populated with symbols from a prior game instance of the bonus game.

In some embodiments, the bonus game may be a hold & spin bonus game. In such embodiments, the method may also include (a) setting a quantity of games remaining in the bonus game to an initial quantity; (b) populating a display matrix with a plurality of symbols selected from a symbol set comprising configurable and non-configurable symbols; (c) holding each configurable symbol at its corresponding display position in the display matrix; (e) reducing the quantity of games remaining; (f) repeating steps (b) to (e) until the quantity of games remaining is zero. In such embodiments, the retained bonus condition may comprise retaining at least one held configurable symbol in its corresponding display position for a use in a subsequent triggering of the bonus game. According to certain aspects, upon completion of the bonus game the player is allowed to select between (1) receiving an award based on the held configurable symbols and (2) retaining each held configurable symbol in its corresponding display position for a use in a subsequent triggering of the bonus game.

Certain embodiments relate to an electronic gaming machine, comprising a credit input mechanism, a player interface, and a controller. The credit input mechanism is configured for receiving a physical item representing a monetary value to establish a credit balance. The player interface is configured for selecting a wager funded by the credit balance and initiating play of a base game. The controller receives a wager input via the player interface, deducts the wager from the credit balance, and conducts an instance of a base game in response to receipt of the wager input. The controller is further configured to conduct a bonus game in response to occurrence of a triggering condition in connection with the base game. In conducting the bonus game, the controller conducts the bonus game using a retained bonus condition if one exists and otherwise conducts the bonus game using a default condition.

In some embodiments, one or more retained bonus conditions may be displayed by the gaming device, e.g., during play of the base game, between plays of the base game, and/or when the game is idle. In some embodiments, the base game may be displayed a primary game display, while any retained bonus condition(s) may be displayed on a secondary game display.

In some embodiments, the gaming device may be configured to automatically display any retained bonus conditions. In other embodiments, the device may be configured to allow the player to "peek" at one or more of the retained bonus conditions, e.g., by pressing a button in the bank of buttons (or on the display) to have one or more retained bonus conditions displayed.

In an embodiment where the bonus game is a hold & spin game as described above, the secondary game display may display a matrix of the held symbols and the banked credits that were retained from a prior play of the bonus game.

In some embodiments, there may be multiple retained bonus conditions. For example, different bet levels may each have a respective retained bonus game condition/state, e.g., a configuration of held symbols or persistent wilds. If multiple retained bonus conditions exist, they may, for example, be simultaneously or sequentially displayed to the player, e.g., on the secondary game display.

In some embodiments, retained bonus conditions may be restricted to the player who earned/achieved the retained bonus condition(s). In other embodiments, retained bonus conditions may be made available to other players, e.g., when the player who earned the retained bonus condition abandons play of the game while a retained bonus condition still exists. In such instances, the retained bonus may be continually displayed when the game is idle in order to attract prospective players to the machine.

In certain embodiments, retained bonus conditions may only be available for a specified period of time, e.g., 5 minutes, 10 minutes or another time, or a specified number of plays of the base game. In some embodiments, retained bonus conditions may gradually decay over time. In some embodiments, the retained bonus conditions may decay in the order, or reverse order, of how they were achieved, e.g., first (or last) achieved sticky wild decays away first. For example, in the context of a hold & spin game, the held symbols in a retained bonus condition may gradually decay (disappear) over time in the order they were achieved, e.g., in FIFO.

DETAILED DESCRIPTION

Figure 1:
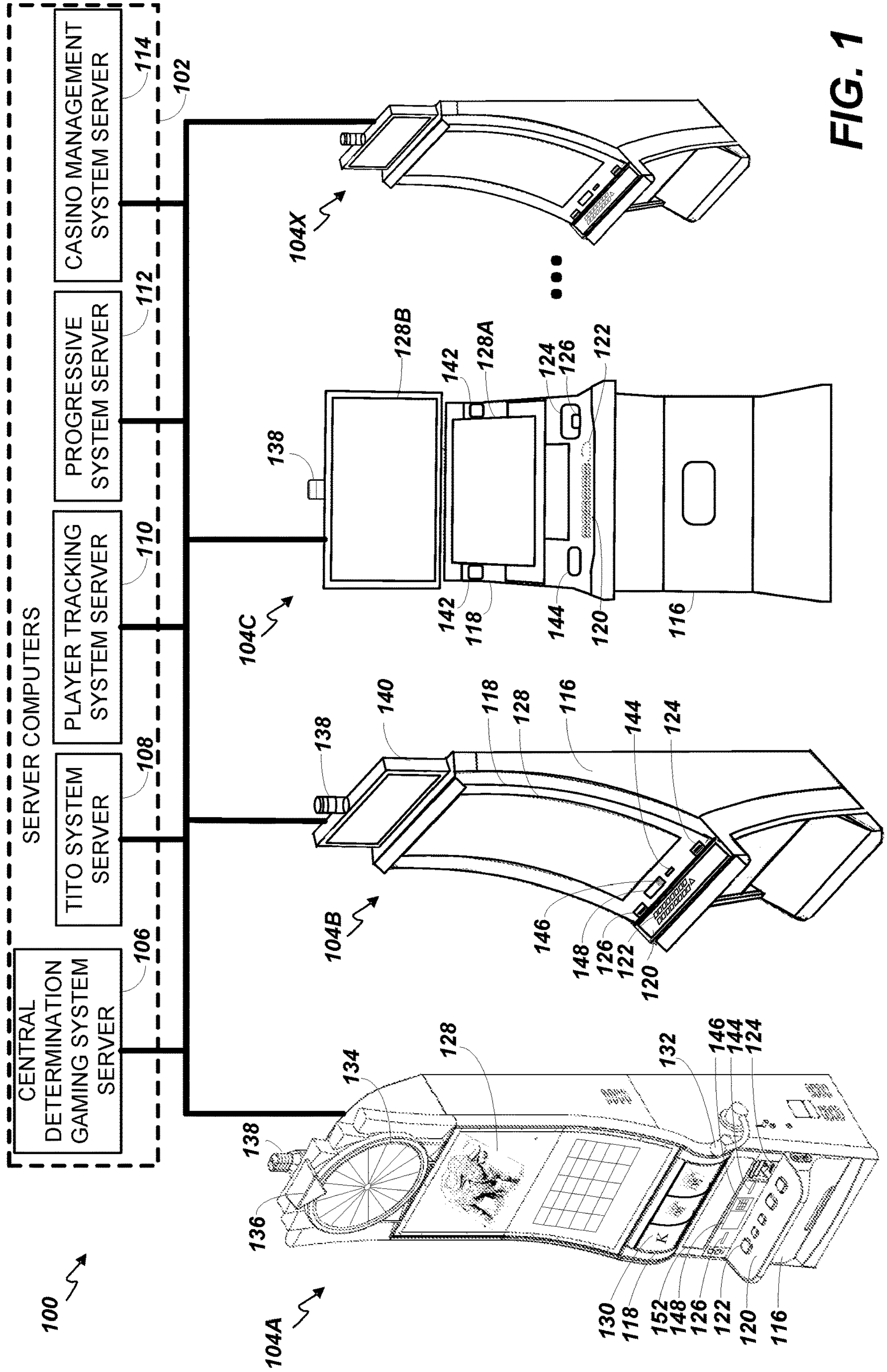
FIG. 1 is an exemplary diagram showing several EGMs networked with various gaming related servers.

Referring to the drawings, there are shown example embodiments of gaming machines having components which enable the implementation of a base game, from which a bonus game may be triggered. According to certain aspects of the present disclosure, outcomes achieved during a play of the bonus game may be retained for use during subsequent triggering of the bonus game. For example, during play of the bonus game, a player may achieve one or more game conditions, such as held special symbols, persistent (sticky) WILD symbols, or award multipliers. These game conditions may be retained at the end of the bonus game and used if the player subsequently triggers another bonus game while playing the base game, instead of starting at a base/default configuration each time the bonus game is triggered.

FIG. 1 illustrates several different models of EGMs which may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present invention may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over a network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 118 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a RELM XL™ model gaming device manufactured by Aristocrat® Technologies, Inc. As shown, gaming device 104A is a reel machine having a gaming display area 127 comprising a number (typically 3 or 5) of mechanical reels 130 with various symbols displayed on them. The reels 130 are independently spun and stopped to show a set of symbols within the gaming display area 127 which may be used to determine an outcome to the game.

In many configurations, the gaming machine 104A may have a main display 128 (e.g., video display monitor) mounted to, or above, the gaming display area 127. The main display 128 can be of variety type, e.g., high-resolution LCD, plasma, LED, or OLED panel which may be flat or curved as shown, a cathode ray tube, or other conventional electronically controlled video monitor. The main display 128 may one or more various orientations (i.e., landscape or portrait), aspect ratios and resolutions.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller (not shown in FIG. 1) within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of a base or a primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
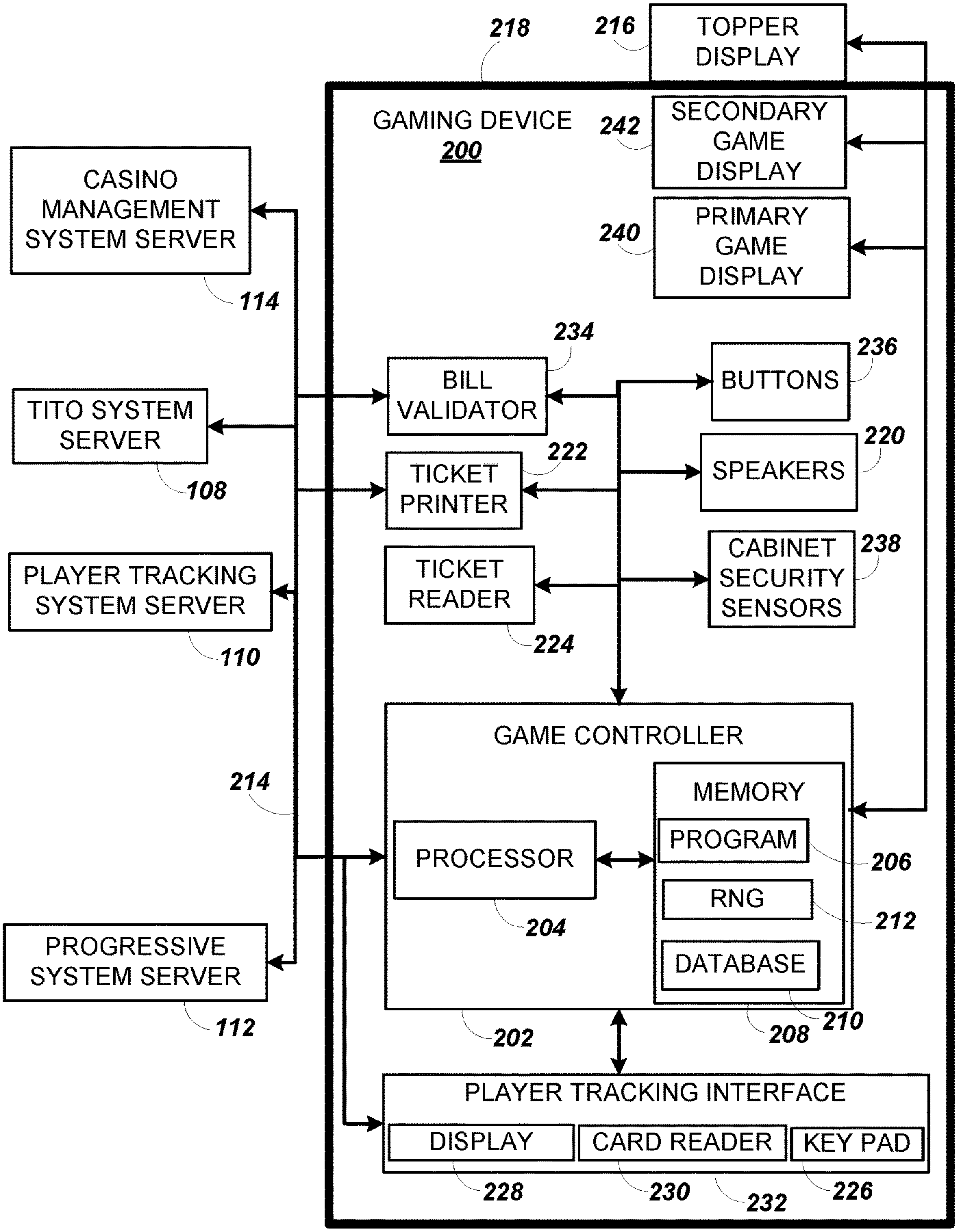
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that, where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary or additional game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 118 which opens to provide access to the interior of the gaming device 104B. The main or service door 118 is typically used by service personnel to refill the ticket-out printer 126 and collect bills and tickets inserted into the bill validator 124. The door 118 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape-style main display 128A may have a curvature radius from top to bottom, or alternatively from side to side. In some embodiments, main display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3 gaming environments, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e. a play or round of the game) may be generated on a remote gaming device such as a central determination gaming system server 106 (not shown in FIG. 2 but shown in FIG. 1). The game instance is communicated to gaming device 200 via the network 214 and then displayed on gaming device 200. Gaming device 200 may execute game software, such as, but not limited to, video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include random access memory (RAM), read only memory (ROM) or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices 200, such as gaming devices 104A-104X, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gaming machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash-out button to receive a ticket from the ticket printer 222). The ticket may be "cashed-in" for money or inserted into another machine to establish a credit balance for play.

While an example gaming device 200 has been described in regard to FIG. 2, certain aspects of the present disclosure may be implemented by gaming devices that lack one or more of the above-described components. For example, not all gaming devices suitable for implementing aspects of the present disclosure necessarily include top boxes, information panels, cashless ticket systems, and/or player tracking systems. Further, some suitable gaming devices may include a single game display having a mechanical reels or a video display. Moreover, other embodiments may be designed for bar tables and have displays that face upwards.

Many different types of wagering games, including mechanical slot games, video slot games, video poker, video black jack, video pachinko, keno, bingo, and lottery, may be provided by the gaming device 200. In particular, a gaming device 200 may be operable to provide many different instances of games of chance. The instances may be differentiated according to themes, sounds, graphics, type of game (e.g., slot game vs. card game vs. game with aspects of skill), denomination, number of paylines, maximum jackpot, progressive or non-progressive, bonus games, class 2 or class 3, etc.

The gaming device 200 may allow a player to select a game of chance, skill, or combination thereof, to play from a plurality of instances available on the gaming device 200. For example, the gaming device 200 may provide a menu with a list of the instances of games that are available for play on the gaming device 200 and a player may be able to select from the list a game that they wish to play.

Reel Arrangement

As explained above, the gaming device 200, in some embodiments, does not include physical or mechanical reels. In such embodiments, the gaming device 200 may display game play functions such as, for example, the spinning of reels via a video display of the primary game display 240. While the gaming device 200 may simulate or animate spinning reels via primary game display 240, the below description does not distinguish between animated reels and mechanical reels. Unless otherwise explicitly specified in the below description or in the appended claims, the contiguous image aspects of the present disclosure are applicable to animated reels as well as mechanical reels.

Figure 3:
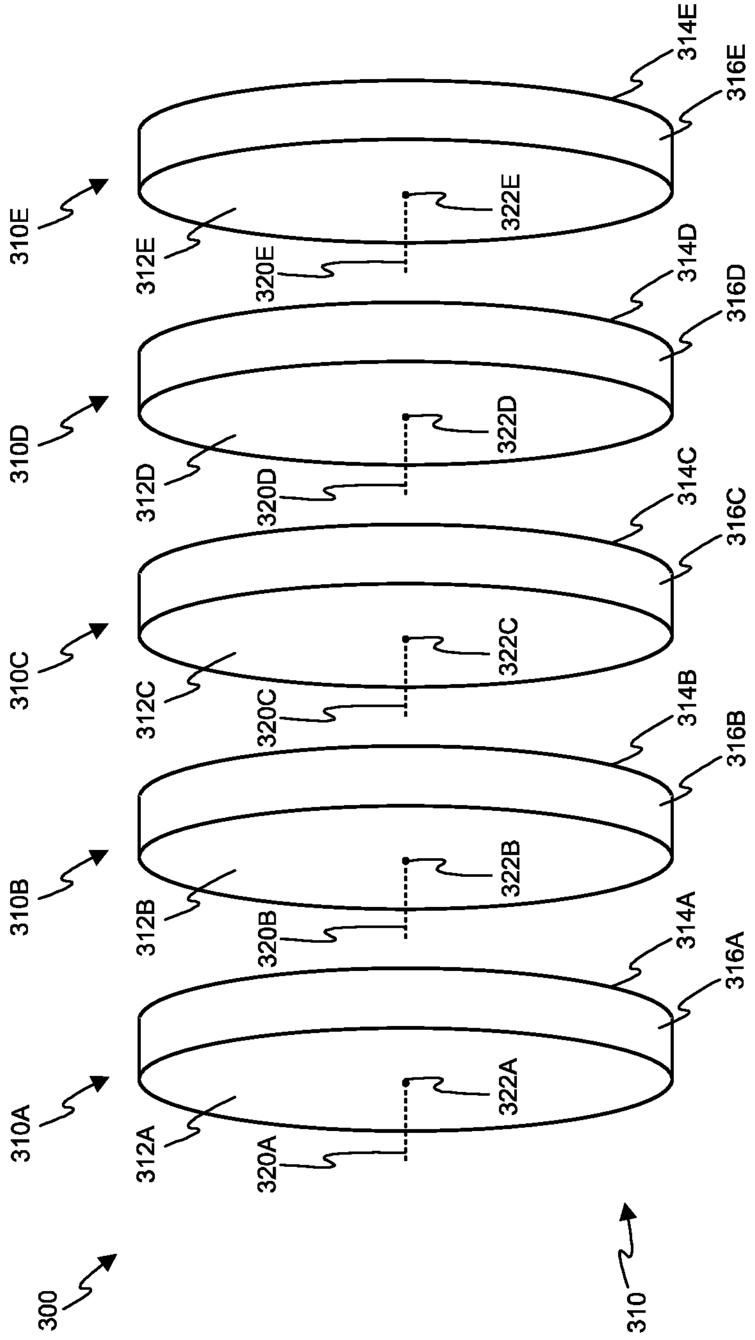
FIG. 3 depicts an exemplary reel arrangement of the EGM of FIG. 2.

Referring now to FIG. 3, an exemplary arrangement 300 of reels 310 is presented. Such depiction of reels 310 is generally applicable to the reels 310 of the gaming device 200 regardless of whether the reels 310 are implemented as mechanical reels or as a simulation or animation of reels displayed upon a video display of the primary game display 240.

As shown, the arrangement 300 may include five reels 310A, 310B, 310C, 310D, 310E, though arrangements having a different number of reels 310 (e.g., three, four, etc.) are contemplated. In the exemplary arrangement 300, each reel 310A-310E may have a cylindrical shape comprising circular ends 312A-312E, 314A-314E connected by a cylindrical outer surface 316A-316E. However, other embodiments of reels 310A-310E may utilize a different cylindrical shape in which the ends 312A-312E do not have circular shape but instead have a regular polygonal shape or have another shape. As further shown, each reel 310A-310E includes an axis of rotation 320A-320E that passes through a central point 322A-322E of ends 312A-312E. The reels 310A-310E may be positioned in a side-by-side manner across the primary game display 240 such that their axes of rotation 320A-320E are arranged along a common axis that spans horizontally across the primary game display 240.

Each reel 310A-310E may further carry symbols along its outer surface 316A-316E. In particular, the outer surface 316A-316E of each reel 310A-310E may carry symbols selected from a set of symbols. For example, the outer surfaces 316A-316E may carry many symbols (e.g., twenty-two or more), but may present only a small subset of such symbols to the player via the primary game display 240. Such an arrangement 300 of reels 310A-310E results in the outer surface 316A-316E of each reel 310A-310E presenting a column of symbols to the player. Thus, in the depicted five reel arrangement 300, the reels 310A-310E may present five columns of symbols.

Figure 4:
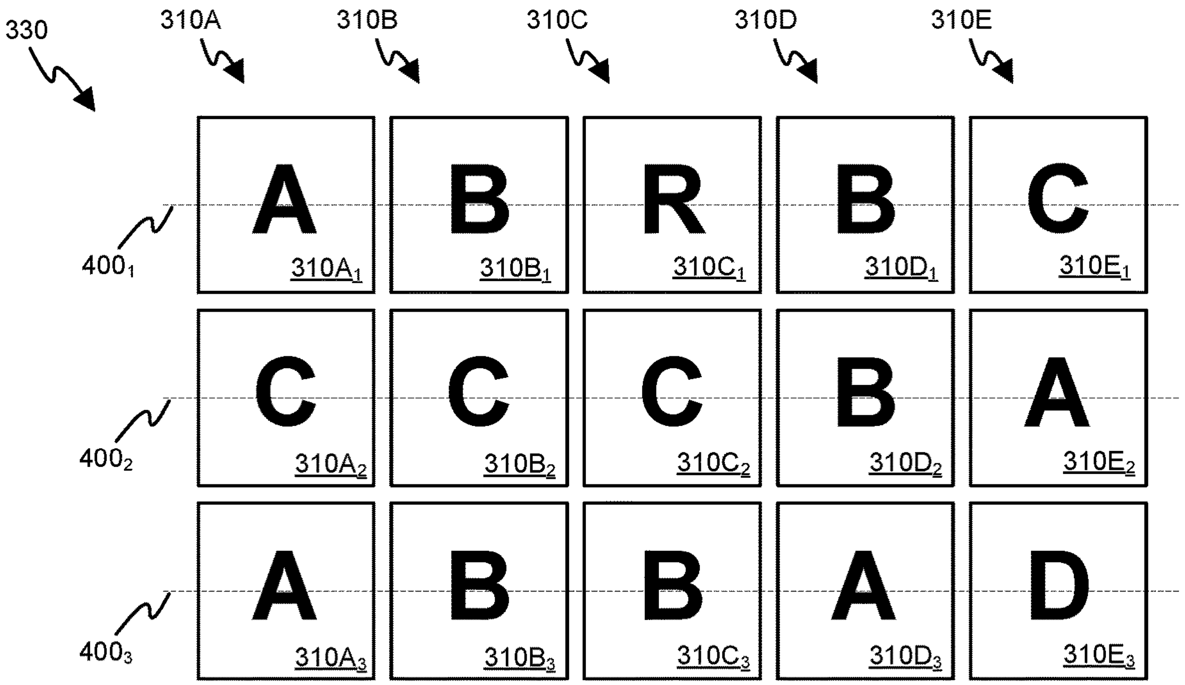
FIG. 4 illustrates an exemplary symbol array that is displayed on the EGM of FIG. 2 according to an embodiment the present disclosure.

Referring additionally to FIG. 4, further details regarding symbols presented by the reels 310A-310E are depicted. As noted above, the outer surfaces 316A-316E may carry many symbols, but may present only a small subset of such symbols to the player via the primary game display 240. To this end, the reels 310A-310E may be physically masked or otherwise implemented such that each reel 310A-310E presents a relatively small number (e.g., three) of display positions to the player when the reels are stopped or otherwise at rest. For example, the first reel 310A may provide three vertically disposed display positions 310$A_1$, 310$A_2$, 310$A_3$; the second reel 310B may provide three vertically disposed display positions 310$B_1$, 310$B_2$, 310$B_3$; the third reel 310C may provide three vertically disposed display positions 310$C_1$, 310$C_2$, 310$C_3$; the fourth reel 310D may provide three vertically disposed display positions 310$D_1$, 310$D_2$, 310$D_3$; and the fifth reel 310E may provide three vertically disposed display positions 310$E_1$, 310$E_2$, 310$E_3$.

As a result of such arrangement, the primary game display 240 may present a 3×5 symbol matrix 330 with three rows and five columns of symbol display positions. While a 3×5 symbol matrix 330 is shown, other embodiments may include a fewer number of reels/columns (e.g., three reels total) or a greater number of reels/columns (e.g., six reels total) and/or rows may be provided. Furthermore, each reel may include a different number of display positions. Moreover, while each reel 310A-310E may present the same number of symbols (e.g., three), embodiments in which not all of the reels 310A-310E present the same number of symbols are contemplated. For example, the central reel 310C in some embodiments may provide a greater number of display positions (e.g., four) than the other reels 310A, 310B, 310D, 310E.

Moreover, while the symbol matrix 330 is described in the context of a spinning reel game, it will be appreciated that symbol matrix 330 may be used in other types of games. For example, particularly in the context of a video display, the symbol matrix 330 may be presented and populated by symbols without providing any representation of reels spinning.

Game Symbols and Paylines

As just described, various aspects of the present disclosure are directed to gaming devices where a plurality of symbols are displayed on an array or matrix 330 of display positions 300A to 300$E_3$ to define game outcomes. In some embodiments, the symbol matrix 330 may be populated with symbols by spinning and stopping a plurality of mechanical or virtual reels. In certain other embodiments, the symbol matrix 330 may be electronically displayed and populated. Once the matrix 330 is populated with symbols, the gaming device may then analyze the symbol array to determine if it contains one or more winning combinations of symbols.

The symbol set may include a plurality of game symbols (e.g., individual cards for a deck of playing cards, letters, cherries, bars, double bars, triple bars, sevens, wilds, scatter, etc.). For example, in some embodiments the game symbols may correspond to individual cards for a deck of playing cards and winning outcomes may be based on card hands, e.g., two of a kind, flushes, straights, etc. The gaming device 200 may increase a credit meter by a number of credits specified in a pay table for the winning combination of symbols.

The gaming device 200 may utilize one or more paylines to determine whether the symbol matrix 330 contains a winning symbol combination or whether the symbol matrix 330 contains symbols that trigger a game event. In particular, a gaming device 200 may provide one or more paylines and may allow the player to make a wager on each payline in a play of the primary game. For example, the gaming device 200 may include 1, 3, 5, 9, 15, 25, or some other number of paylines upon which the player may wager or otherwise activate. The gaming device 200 may allow players to make wagers of substantially different amounts on each play of the primary or base game ranging, for example, from one credit up to 125 credits (e.g., five credits on each of 25 separate paylines).

The paylines may be horizontal (see, e.g., paylines $\mathbf{400}_1$, $\mathbf{400}_2$, $\mathbf{400}_3$ of FIG. 4), vertical, circular, diagonal, angled, zigzagged, or any combination thereof. Each payline identifies a subset of symbols or display positions of the symbol matrix 330. For example, FIG. 4 depicts an embodiment having three horizontal paylines $\mathbf{400}_1$, $\mathbf{400}_2$, $\mathbf{400}_3$. The top payline $\mathbf{400}_1$ corresponds to the top row of display positions 310$A_1$, 310$B_1$, 310$C_1$, 310$D_1$, 310$E_1$. The center payline $\mathbf{400}_2$ corresponds to the center row of display positions 310$A_2$, 310$B_2$, 310$C_2$, 310$D_2$, 310$E_2$. The bottom payline $\mathbf{400}_3$ corresponds to the bottom row of display positions 310$A_3$, 310$B_3$, 310$C_3$, 310$D_3$, 310$E_3$ In some embodiments, the paylines $\mathbf{400}_1$, $\mathbf{400}_2$, $\mathbf{400}_3$ are selectively activated based on, for example, a player's wager or gaming outcomes. In such embodiments, the gaming device 200 may only award prizes or trigger game events based on symbols aligned with activated paylines $\mathbf{400}_1$, $\mathbf{400}_2$, $\mathbf{400}_3$.

Game Play

Figure 5A:
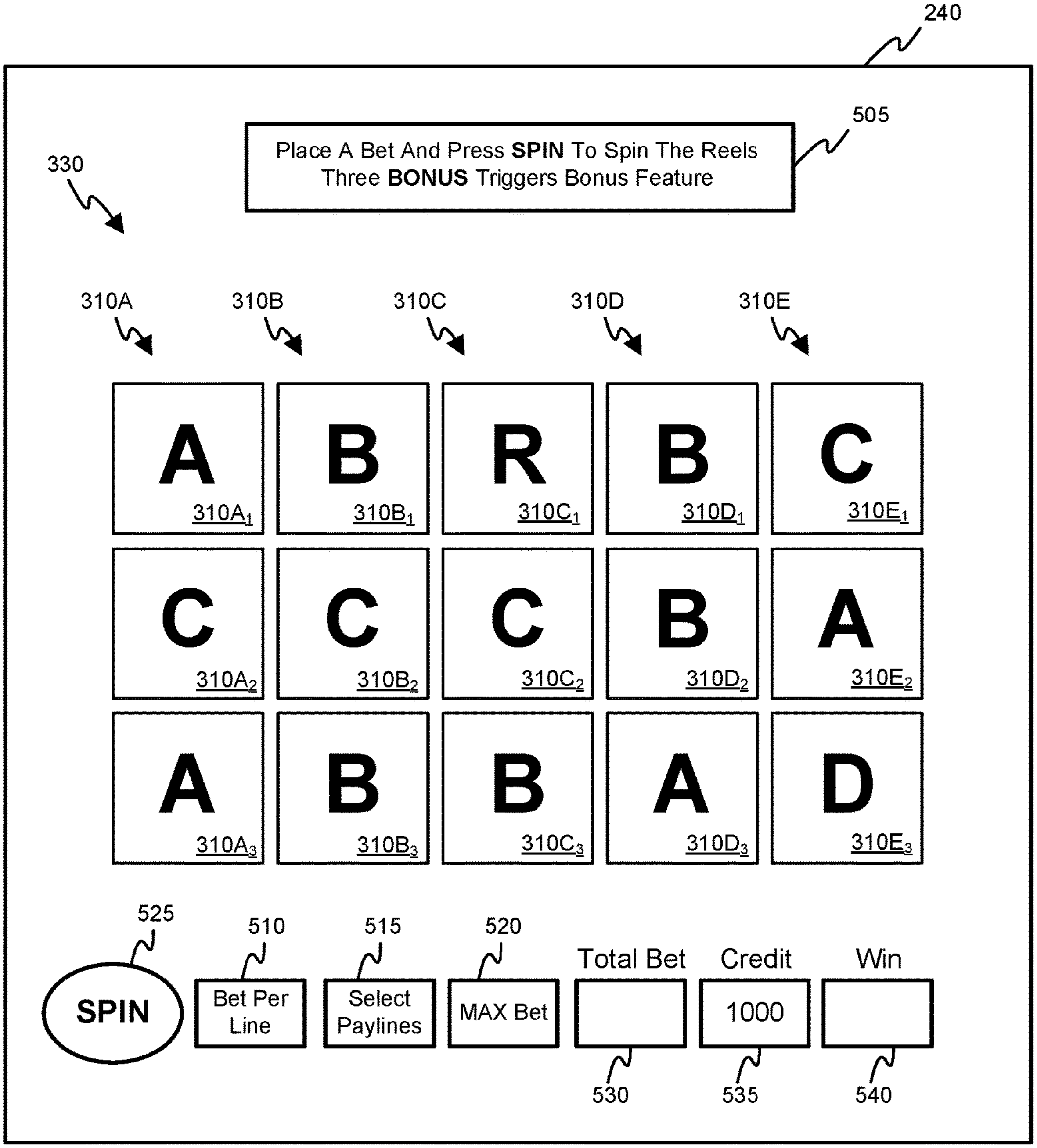
FIGS. 5A to 5J illustrate screen shots of one exemplary embodiment of the gaming system of the present disclosure.
Figure 5B:
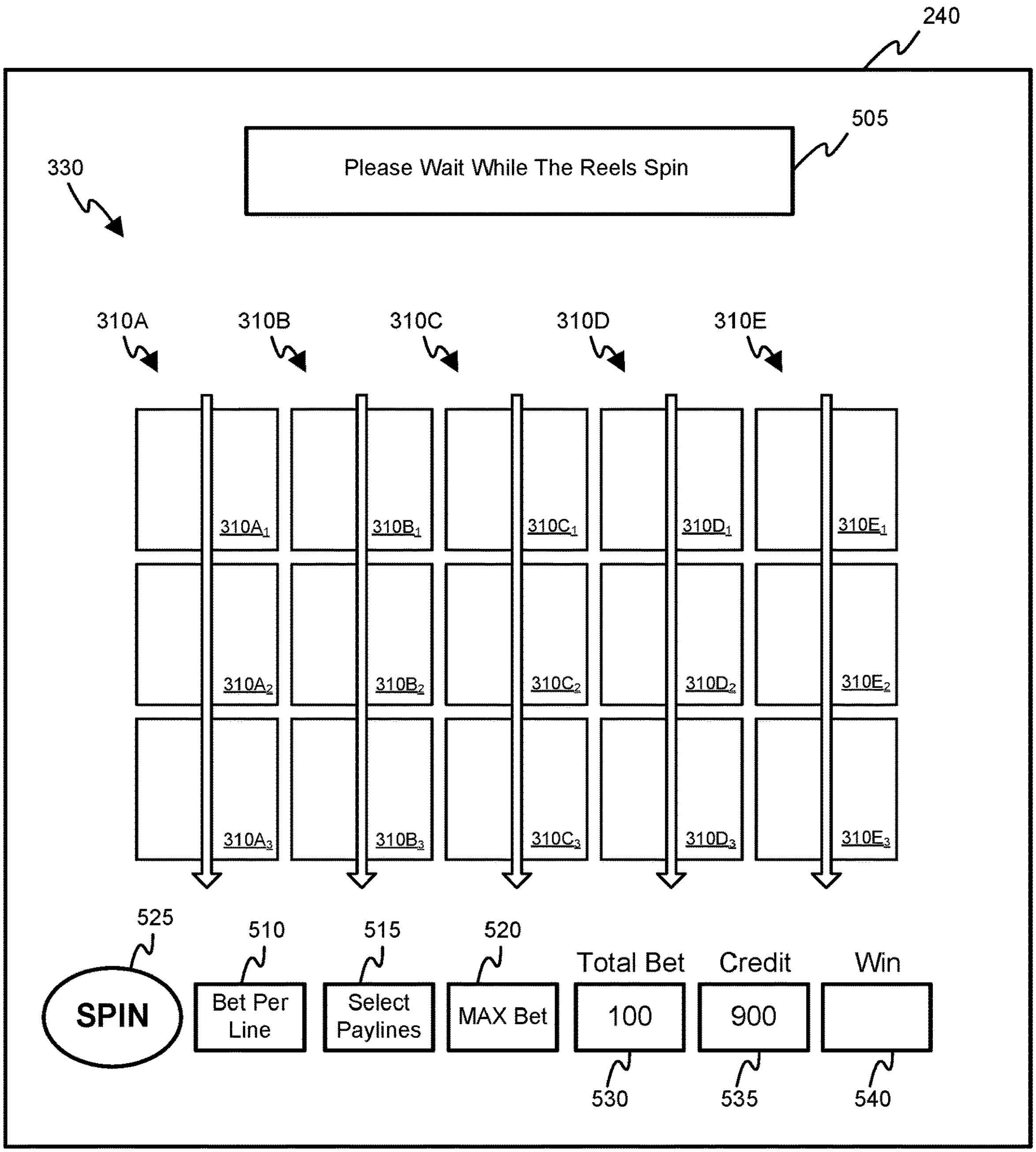
Figure 5C:
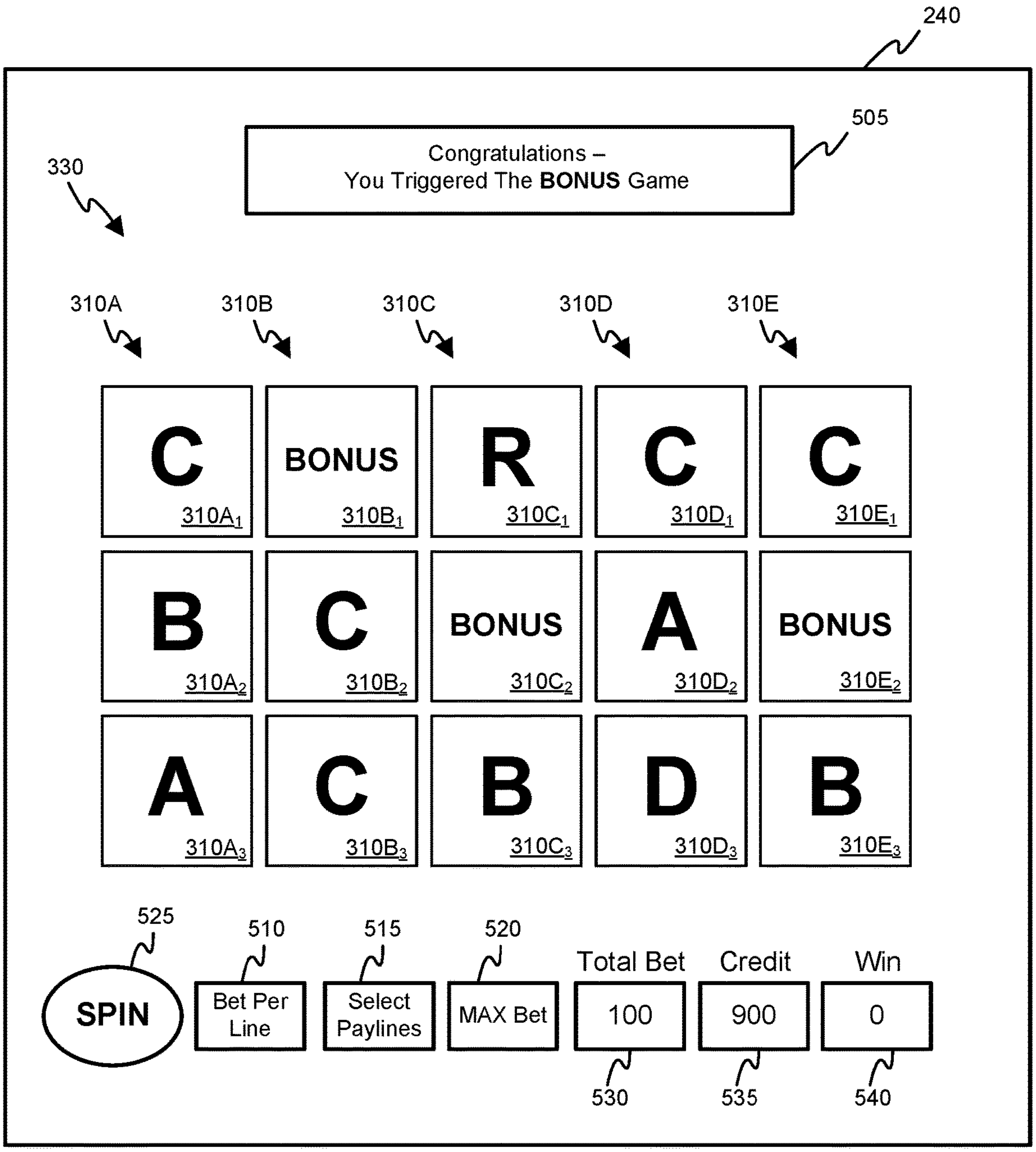

FIGS. 5A to 5C illustrate screen shots during play of an exemplary base game, while FIGS. 5D to 5I are screen shots during play of an exemplary bonus game that may be triggered during play of the base game. As explained in greater detail below, according to certain aspects of the present disclosure, outcomes achieved during play of the bonus game may be retained for use during subsequent triggering of the bonus game. For example, during play of the bonus game, a player may achieve one or more game conditions, such as held special symbols, sticky WILD symbols, or award multipliers. These conditions may be retained at the end of the bonus game and used if the player subsequently triggers another bonus game while playing the base game, instead of starting at a base/default condition each time the bonus game is triggered.

FIG. 5A is a screen shot of the primary game display 240 during play of the base game. As shown, during play of the base game, the gaming device 200 displays matrix 330 of reels 310A-310E in display 240. Display 240 may also include a message box 505 that displays a variety of messages or indications before, during, or after play of the base game. In some embodiments, the player may interact with the game via buttons on the game deck 120. Additionally or alternatively, the display 240 may present a plurality of buttons that are actuatable by the player during game play. The buttons may include, for example, (a) a Bet Per Line button 510 that, when actuated by the player, causes the gaming system to enable the player to select an amount to bet on each wagered payline; (b) a Select Lines button 515 that, when actuated by the player, causes the gaming device 200 to enable the player to select the paylines on which the player desires to wager for a play of the base game; (c) a Max Bet button 520 that, when actuated by the player, causes the gaming device 200 to set the amount bet on each payline to a maximum amount and to set the quantity of paylines on which the player desires to wager to a maximum quantity of the paylines; and (v) a Spin button 525 that, when actuated by the player, causes the gaming device 200 to initiate a play of the base game. The display area 240 may also present a plurality of meters including: (a) a bet meter 530 that displays any bet placed on a play of the base game (in credit or currency form), (b) a credit meter 535 that displays the player's credit balance (in credit or currency form), and (c) an award meter 540 that displays any awards won for the play of the base game (in credit or currency form).

Figure 6A:
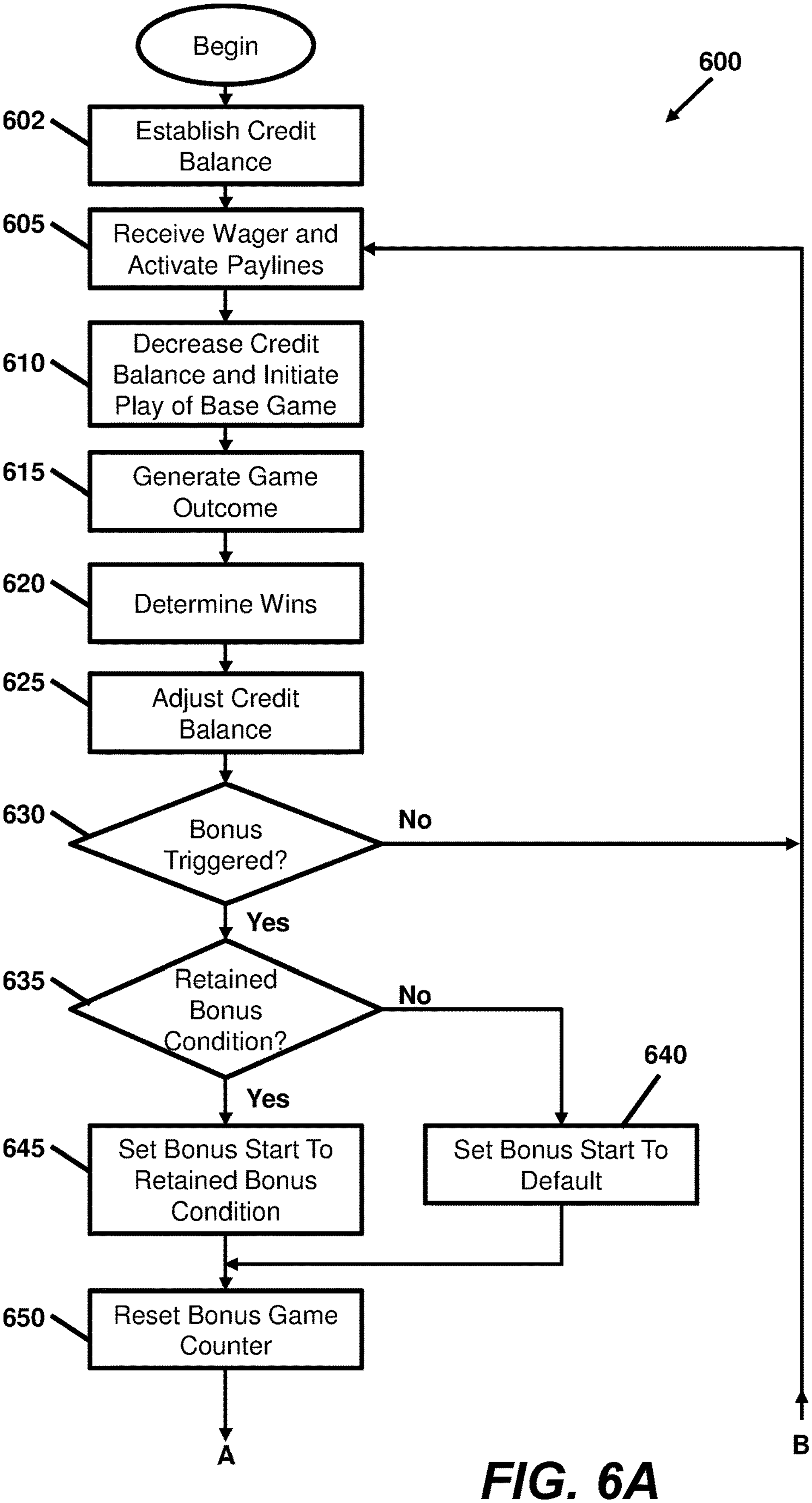
FIGS. 6A & 6B illustrate a flowchart for an example embodiment of a process for operating the EGM of FIG. 2 in accordance with various aspects of the present disclosure.
Figure 6B:
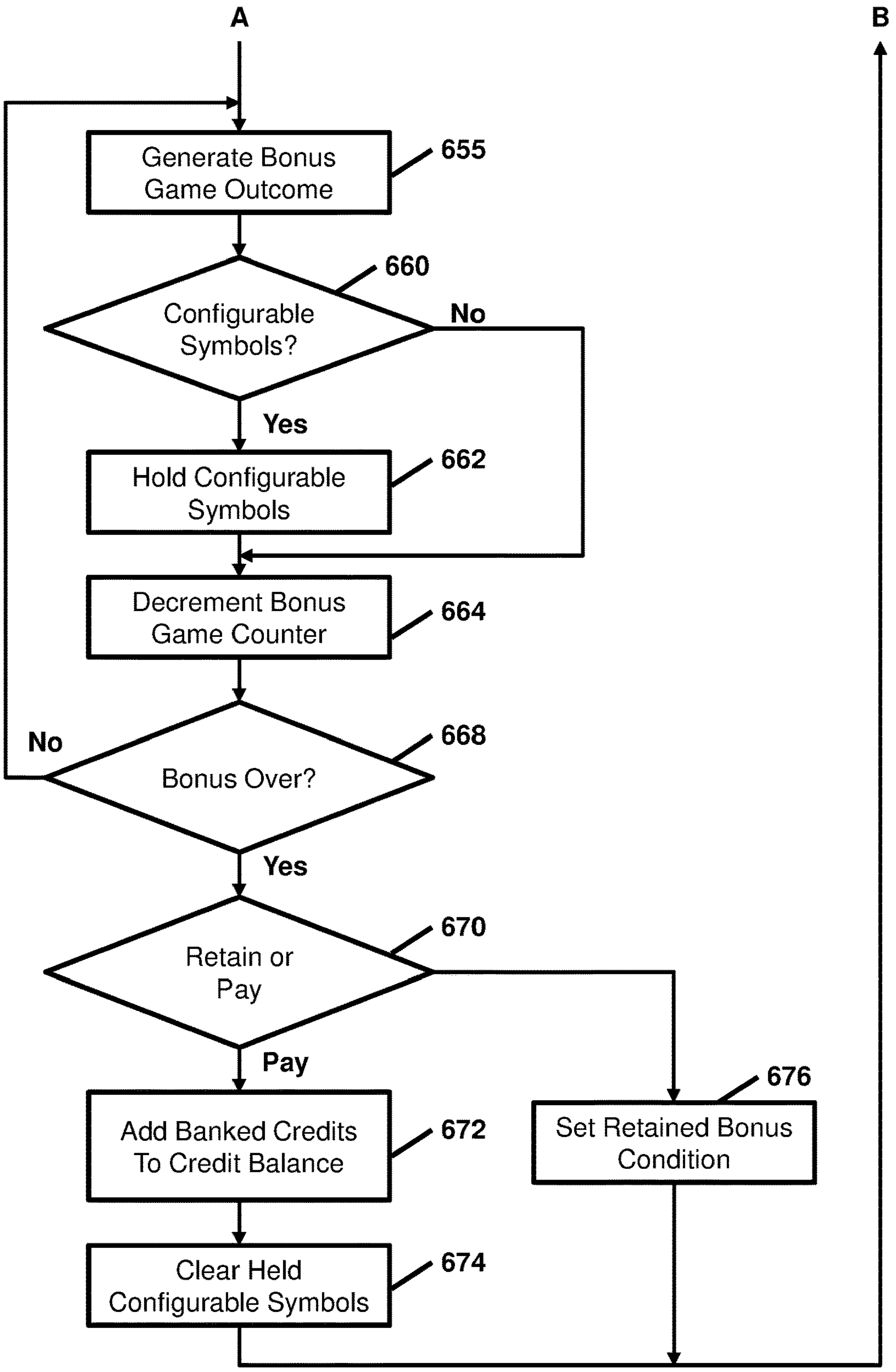

Exemplary play of the base and feature game will now be described with additional reference to the flowchart shown in FIGS. 6A and 6B. At 602, the gaming device 200 may establish an associated credit value on a credit meter 535. To this end, a player may insert a physical item having monetary value into a credit input mechanism 210, such as the ticket reader 224, of the gaming device 200. In response to the received physical item, the gaming device 200 may increase a credit value (e.g., to 1000 in this example) of the credit meter 535 based on the monetary value of the physical item.

At 605, the gaming device 200 may receive a wager and may activate one or more paylines $\mathbf{400}_1$, $\mathbf{400}_2$, $\mathbf{400}_3$. For example, in some embodiments, the gaming device 200 allows the player to selectively activate a number of paylines $\mathbf{400}_1$, $\mathbf{400}_2$, $\mathbf{400}_3$ via the Select Paylines button 515. In other embodiments, the paylines may be automatically activated by the gaming device 200 without player input. A player may use the Bet Per Line or Max Wager buttons 510, 520 to specify a value of an amount to be wagered on each active payline, with the wager being funded by the credit value of the credit meter.

The gaming device 200 may display a message such as "Press SPIN to play" in the message box 505. When the player presses the SPIN button 525, the gaming device 200 at 610 may decrease the credit meter 535 by the specified wager and initiate play of a spinning reel game by spinning reels 310A-310E. In the example (see, e.g., FIG. 5B), the gaming device has received a wager of 100 credits (see bet meter 530), which is deducted from the credit meter 535 when the player initiates the game by pressing the spin button 525. The gaming device 200 may display a message such as "Please Wait While the Reels Spin" in the message box 505.

Next, at 615, the gaming device 200 may stop the reels 310A-310E based on one or more random values generated by RNG 212 to obtain a game outcome comprising a matrix 330 of symbols as shown in FIG. 5C. In other embodiments, the gaming device 200 may stop the reels 310A-310E based on information received from central determination gaming server 106.

The gaming device 200 at 620 may then determine whether the symbols displayed in the symbol matrix 330 include one or more winning symbol combination. For example, at 620, the gaming device 200 may determine if there are any winning combinations of symbols along one of the activated paylines $\mathbf{400}_1$, $\mathbf{400}_2$, $\mathbf{400}_3$. Winning symbol combinations along the activated paylines may result in the award of prize(s) by increasing the credit value of the credit meter based on the prize(s) for such winning combination (s).

At 625, the gaming device 200 may adjust the credit balance on the credit meter 535 in accordance with any winning symbol combinations that were identified in 620. The message box 505 may also provide a message in accordance with the game outcome. For example, when the game outcome includes one or more winning symbol combinations, the message box 505 may display a message such as "Congratulations—You Won X Credits!" (where X is the number of credits won by the player). Conversely, when the game outcome does not include any winning symbol combinations, a message such as "Sorry—You Didn't Win—Spin Again," may be displayed in the message box 505 (as is shown in FIG. 5C).

At 630, the gaming device 200 determines whether a bonus triggering event occurred. The bonus trigger event may occur, for example, on the occurrence of a predetermined combination of symbols, or at random, or by some other process. In the illustrated embodiment, the bonus trigger occurs when 3 or more Bonus symbols appear in a base game outcome. Here, the gaming device 200 determines that the bonus triggering event occurred because three Bonus symbols are displayed in the symbol matrix 330 at positions 300$B_1$, 300$B_2$, and 300$B_3$. When a trigger event occurs, the gaming device 200 may display a message such as "Congratulations, You Triggered The BONUS Game" in the message box 505.

If the bonus game is not triggered, the process returns to 605 to allow the player to continue playing the base game. Alternatively, when a bonus trigger occurs, the gaming device 200 may transition to a bonus game as described below.

FIGS. 5D to 5I are screen shots during play of an exemplary bonus game. In the illustrated embodiment, the bonus game is in the form of a "hold & spin" game. Examples of such hold & spin games are described in U.S. Patent Publication No. 2016/0042597, the disclosure of which is hereby incorporated by reference in its entirety. During play of the hold & spin bonus game, the player receives a predetermined number of spins (6 in the illustrated example) during which the player may accumulate configurable symbols that bear a variable prize amount. In the illustrated embodiment, the configurable symbols are in the form of pearls that are overlaid with an indicia of award, which may, for example, be a number of credits, a particular prize, such as a car, or a jackpot win, such as a Mini, Minor, Maxi, or Major jackpot. During each round/spin of the bonus game, the gaming device 200 spins and stops reels 310A-310E to obtain a bonus game outcome in the symbol matrix 330. In an embodiment, the hold & spin bonus game is played with a symbol set comprising configurable and non-configurable symbols. Although the non-configurable game symbols may also appear in bonus game outcomes, only configurable symbols are used to award prizes during play of the bonus game in this example. Any configurable symbols that appear in a bonus game outcome are retained on the matrix 330 until the end of the bonus game, e.g., after all of the spins have occurred, and the total credits displayed by the configurable symbols (and any other prizes) may be awarded to the player at the end of the bonus game. In an embodiment, the player may be awarded an enhanced prize, e.g., a multiplier such as 3× multiplier or a particular jackpot, such as a GRAND jackpot, for filling the entire symbol matrix 330 with configurable symbols.

According to aspects of the present disclosure, the configurable symbols collected during a bonus game may be retained for a subsequent play of the bonus game. For example, during a first play of the bonus game, a player may only partially fill the symbol matrix 330 with configurable symbols. If the player subsequently triggers another bonus game during play of the base game, the bonus game may be started with the retained bonus condition, i.e., with the previously collected configurable symbols, instead of starting with the default condition, e.g., with no configurable symbols. In some embodiments, the player may be given the option of cashing out all or a portion of any earned credits at the end of a bonus game or retaining all or a portion of any collected configurable symbols for use in a subsequent bonus game with the hopes of achieving an even larger payout, e.g., by completely filling the screen. In such instances, the player may forfeit any credits (or other prizes) won during the bonus game if he/she fails to trigger another bonus game.

Figure 5D:
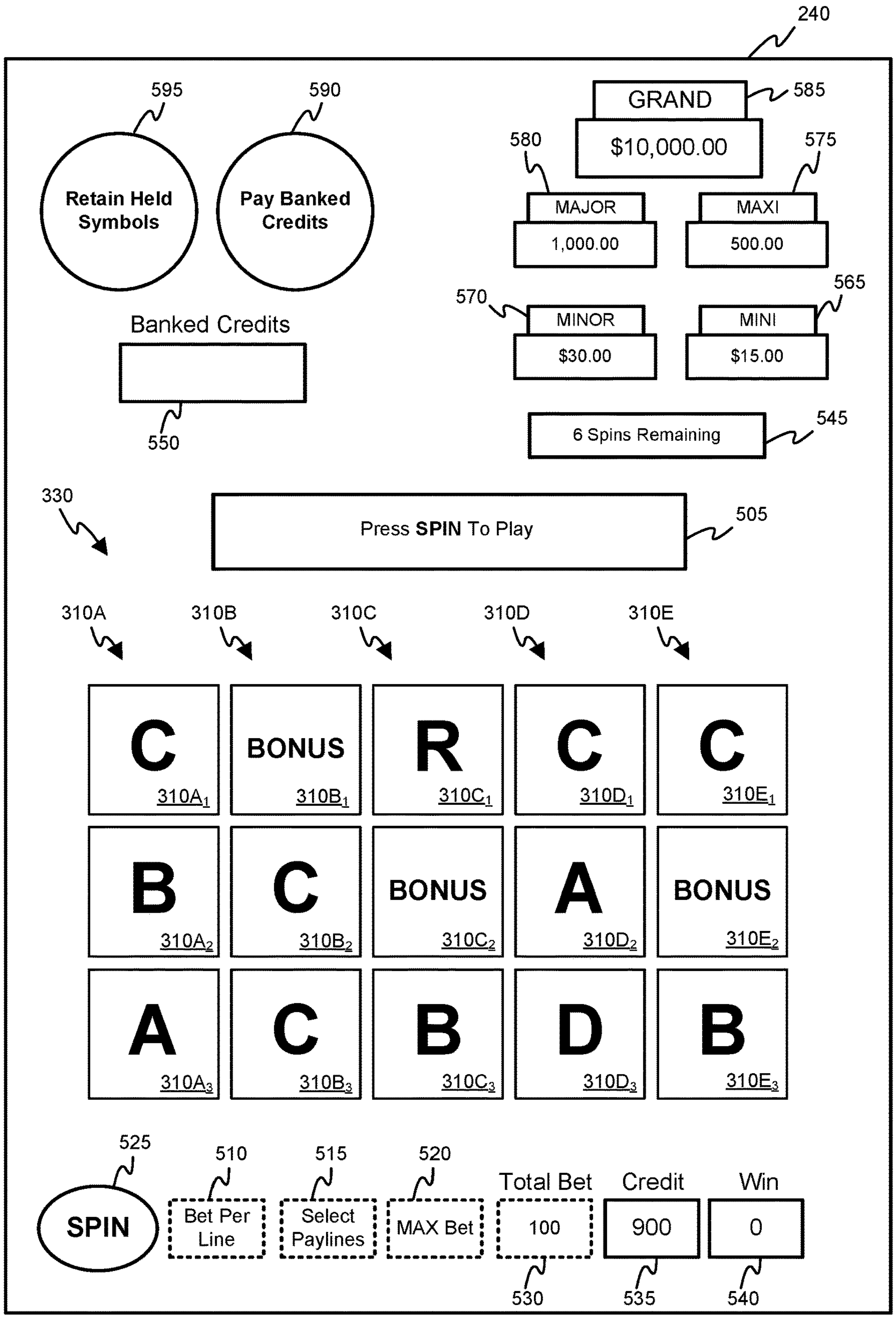
Figure 5E:
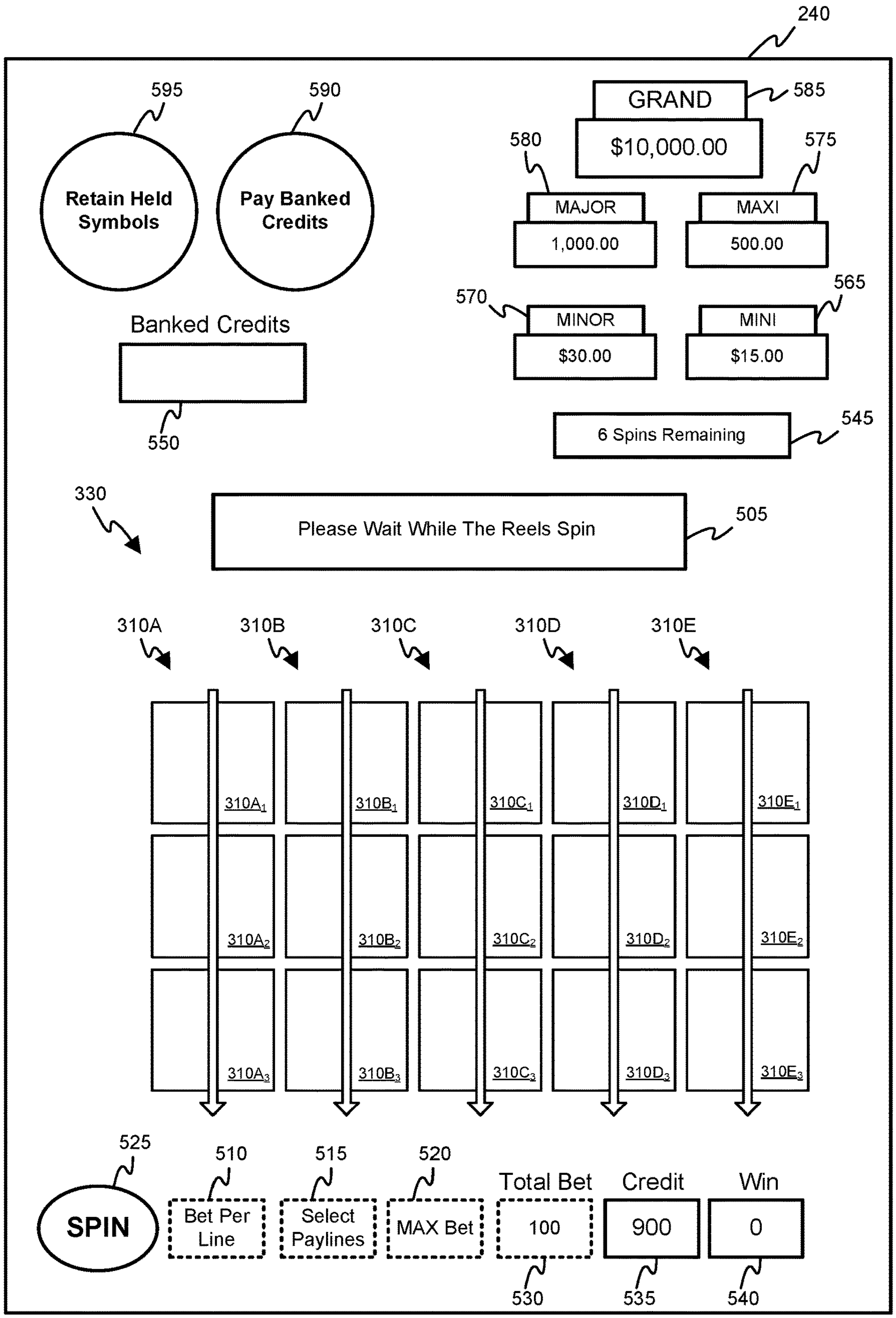
Figure 5F:
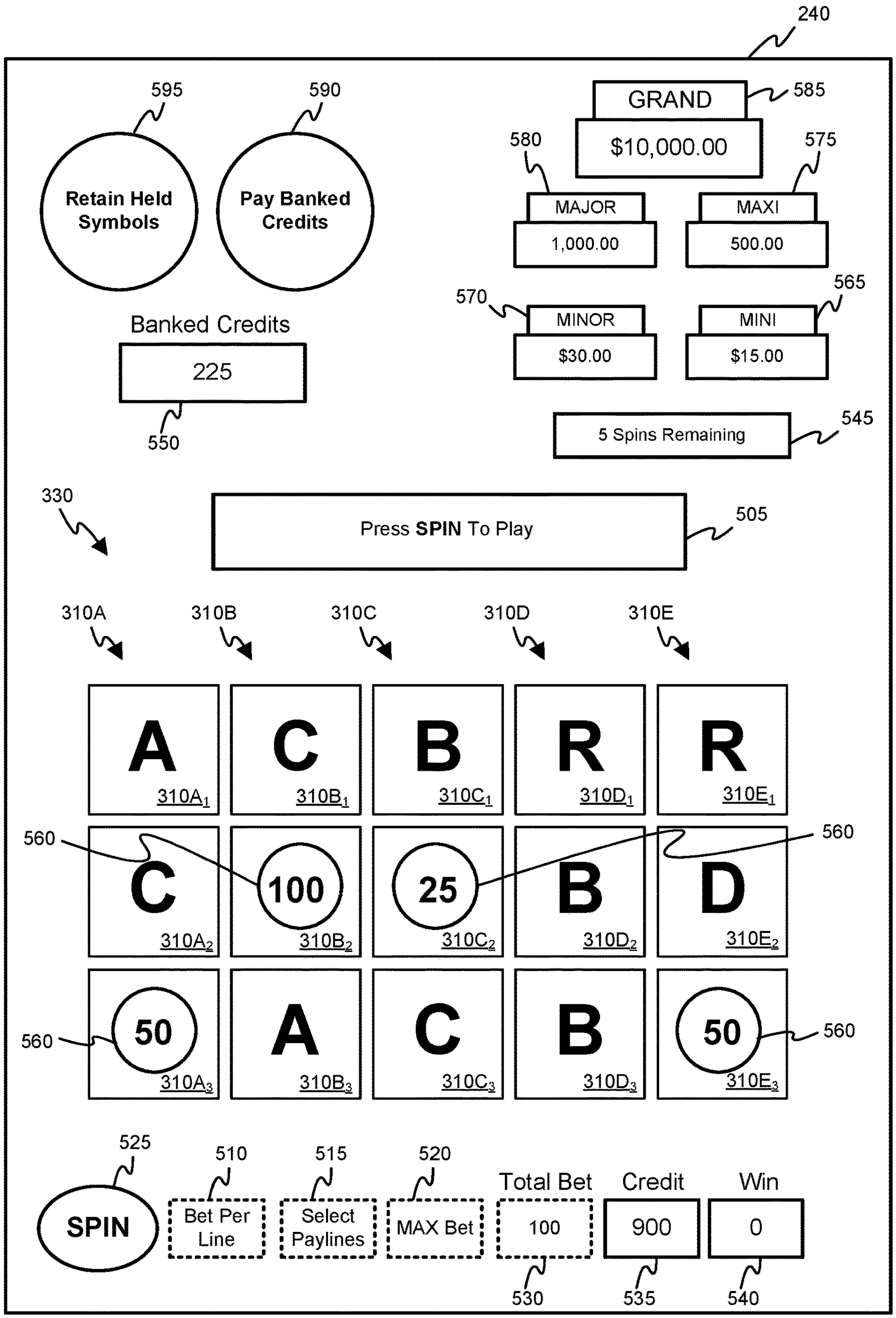
Figure 5G:
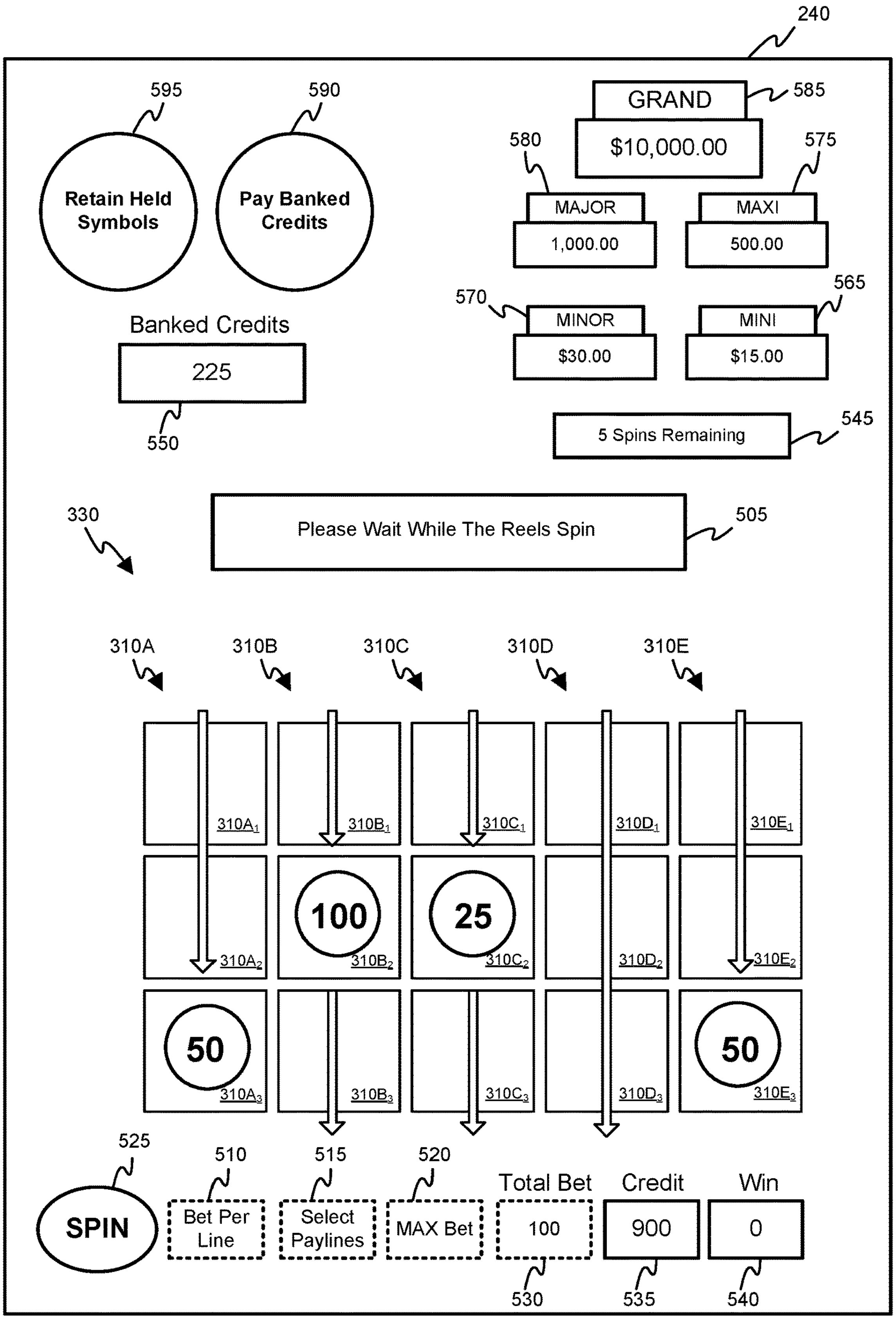
Figure 5H:
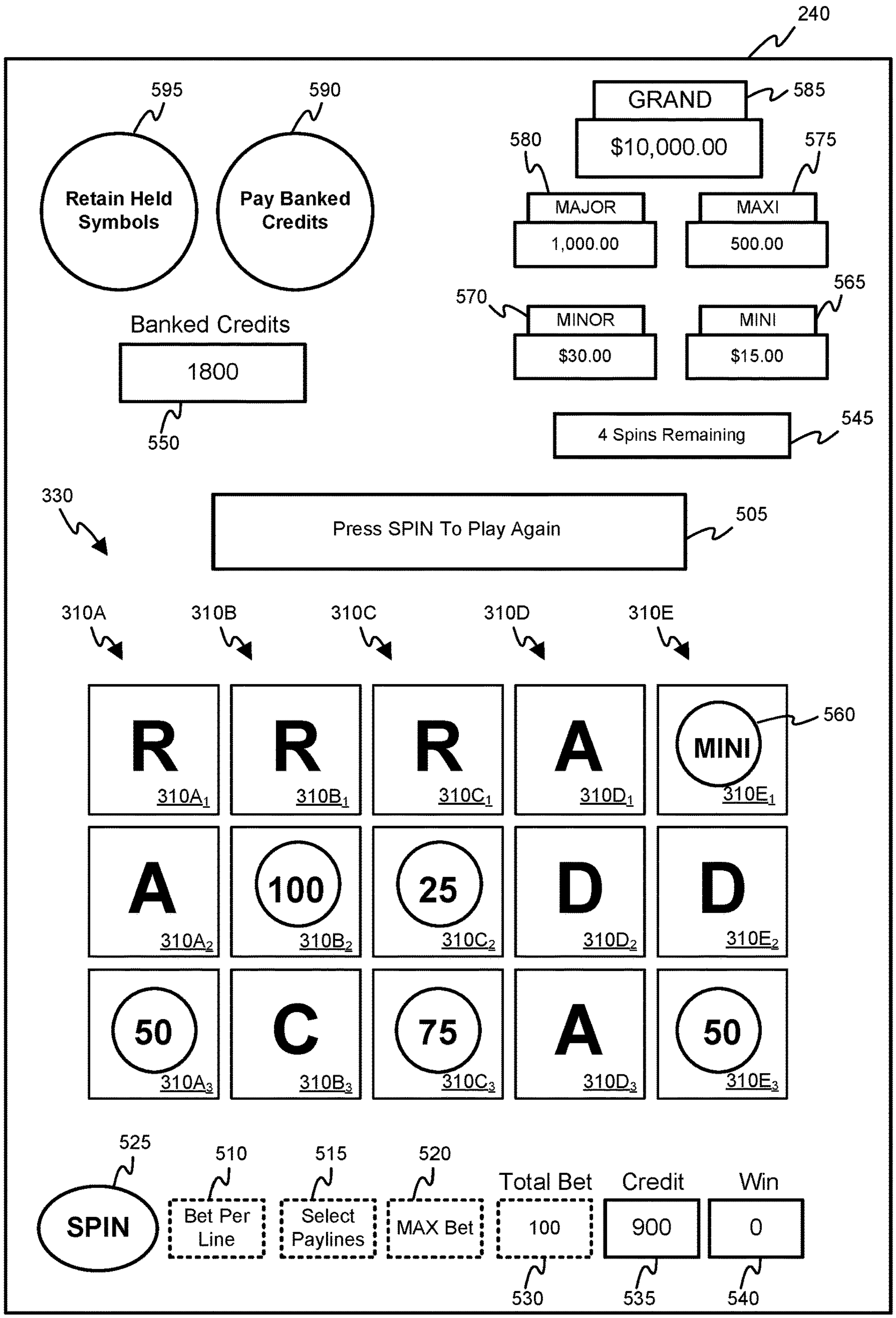

FIG. 5D is a screen shot of the primary game display 240 at the start of the hold & spin bonus game. In the illustrated embodiment, the gaming device 200 reconfigures the display 240 from the format presented during play of the base game to a bonus game format. In this regard, the display 240 may present a Spins Remaining counter 545, a Banked Credits meter 550, and one or more number of Jackpot meters. In the illustrated embodiment, the display includes a MINI Jackpot meter 565, a MINOR Jackpot meter 570, a MAXI Jackpot meter 575, a MAJOR Jackpot meter 580, and a GRAND Jackpot meter 585. Elements of the display from the base game that are not used during play of the bonus game may not appear on the display 240 during the bonus game, or they may have a modified appearance to indicate that they are not currently active. For example, the Bet Per Line button 510, Select Lines button 515, Max Bet button 520, and Total Bet meter 530 are illustrated in dotted lines in FIG. 5D to indicate they are inactive during the bonus game.

Following a bonus game being triggered at 630, the gaming device 200 determines, at 635, whether a retained bonus condition exists, i.e., from a previous play of the base game. If there is not a retained bonus condition, then the bonus starting condition is set to a default condition at 640. In the illustrated example, the display matrix 330 remains unchanged from the base game outcome that triggered the bonus game, (see, e.g., FIG. 5D), when there is not a retained bonus condition. Conversely, if a retained bonus condition exists, then the bonus starting condition is set based on the retained bonus condition at 645. For example, as discussed above, the display matrix 330 may be populated with the retained configurable symbols from a previously triggered bonus game.

After the bonus start condition is configured in 640 or 645, the gaming device 200 at 650 resets the Spins Remaining counter 545 to its starting value. In the illustrated embodiment, the bonus game provides 6 rounds/spins, so the counter 545 is reset to indicate that the player has 6 spins remaining.

The gaming device 200 may display a message such as "Press SPIN to Play" in the message box 505, as is shown in FIG. 5D. When the player presses the SPIN button, the gaming device 200, in 655, controls the symbol matrix 330 to show reels 310A-310E as spinning (see, e.g., FIG. 5E) and stopping (based on one or more random values generated by RNG 212) to obtain a game outcome. (See, e.g., FIG. 5F). As noted above, the symbol set in the bonus game utilizes configurable and non-configurable symbols. The configurable symbols may, for example, be the symbol set that was utilized for the base game.

The gaming device 200, at 660, may then determine whether the bonus game outcome displayed in the symbol matrix 330 includes any configurable symbols. In the illustrated example, the outcome from the first spin resulted in four configurable symbols 560, namely, a 100 Credit symbol in position 310$B_2$, a 25 Credit symbol in position 310$C_2$, and two 50 Credit symbols in positions 310$A_3$ and 310$E_3$ (See FIG. 5F). The gaming device 200 may update the Bank Credit meter 550 to reflect the number of credits (e.g., 225 credits) accumulated at this point of the bonus game.

Next, at 662, any configurable symbols shown in the game outcome are held on the symbol matrix 330. The gaming device then decrements the Spins Remaining counter 545 at 664 and determines if there are any spins remaining in the bonus game at 668. If there are spins remaining, control returns to 655 where the gaming device 200 waits for the player to depress the SPIN button. When the player presses the SPIN button, the gaming device 200 generates another bonus game outcome by holding any configurable symbols in their respective display positions on the matrix 330 and populating the remaining display positions with symbols randomly selected from the bonus game symbol set. In generating the bonus game outcome, the gaming device controls the display 240 to depict the reels 310A-310E as spinning in any positions that are not occupied by a held configurable symbol (see, e.g., FIG. 5G). The gaming device 200 then controls the display 240 to show the reels as stopping to provide another bonus game outcome that includes the previously held configurable symbols and symbols selected from the bonus symbol set at any of the symbol display positions that are not already populated with configurable symbols.

At 660, the game device 200 determines if the game outcome from the second spin includes any additional configurable symbols. In this instance, the second spin resulted in a 75 credit symbol at display position 310$C_3$ and a MINI jackpot symbol at display position 310$E_1$ (See FIG. 5H). The gaming device 200 updates the Banked Credit meter 550 to reflect the additional credits collected during the second spin. In this example, a 1 cent game would pay 1500 credits for the MINI jackpot award. Accordingly, the Banked Credit meter 550 is increased by 1575 credits to show that 1800 credits have been accumulated from the first and second spins in the bonus game.

As with the first spin, the gaming device 200 then holds any configurable symbols in their respective display positions on the matrix 330 at 662, decrements the Spins Remaining counter 545 at 664, and determines if there are any spins remaining in the bonus game at 668. If there are spins remaining, control returns to 655 where the gaming device 200 waits for the player to depress the SPIN button.

Figure 5I:
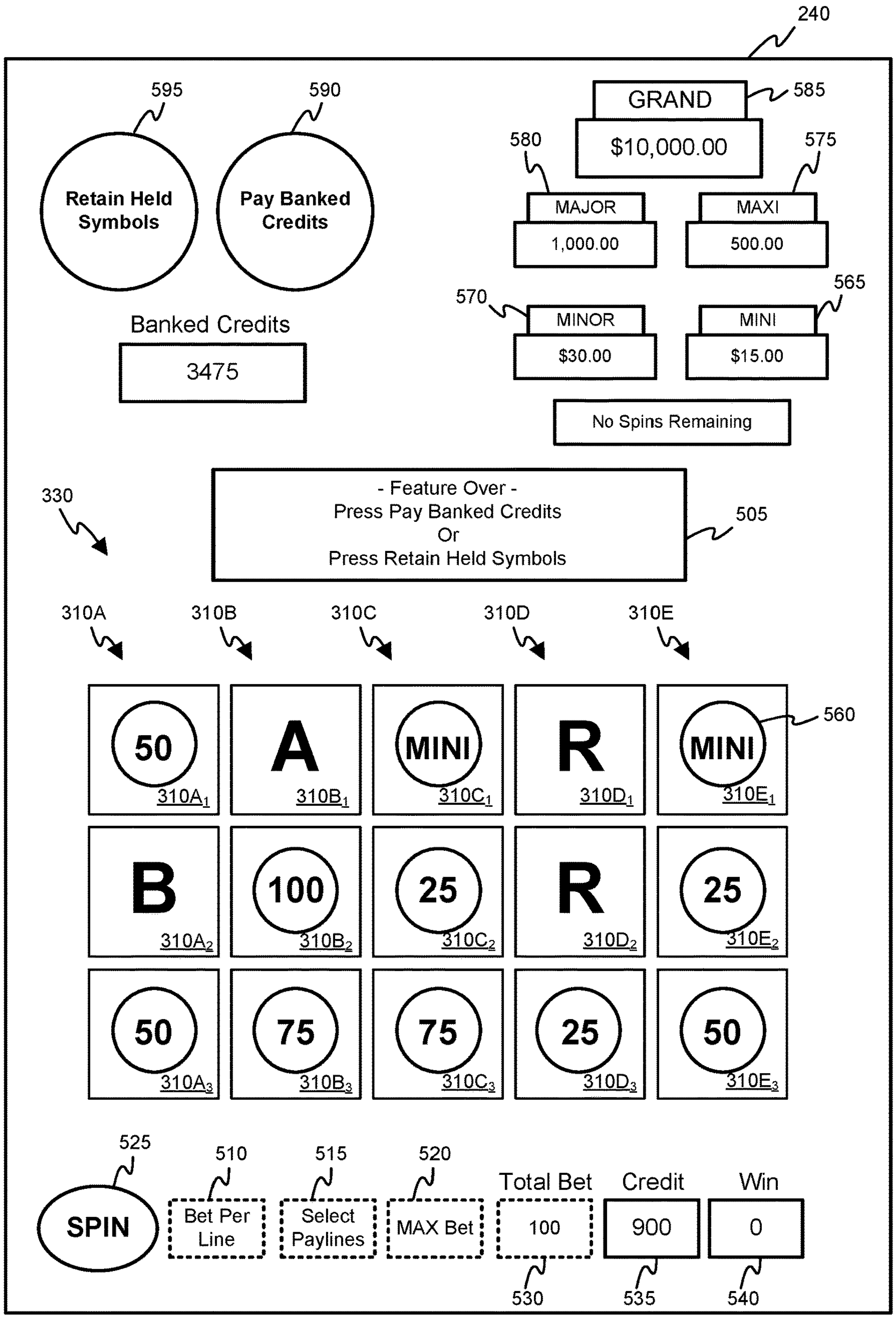

Conversely, control moves to 670 when no spins remain and the bonus game is completed. FIG. 5I is a screen shot showing the display 240 following completion of the bonus game. In this example, the player has accumulated 11 configurable symbols on the matrix 330 with a combined value of 3475 credits as reflected on the Banked Credit meter 550. Upon completion of the bonus game, the player may be given the option of collecting the banked credits or retaining the held configurable symbols. The gaming device 200 may display a message such as "Feature Over—Press Pay Banked Credits or Retain Held Symbols" in the message box 505. The display also includes a Pay Banked Credits button 590 and a Retain Held Symbols button 595.

If the player presses the Pay Banked Credits button 590, control moves to 672 where the gaming device 200 adds the banked credits to the credit balance on the credit meter 535. Next, at 674, the gaming device clears the held configurable symbols and control returns to 605 where the player may continue to play the base game.

Conversely, if the player presses the "Retain Held Symbols" button 595, control moves to 676 where the retained bonus condition is set to retain the held configurable symbols and banked credits that were accumulated during play of the bonus game. Control is then moved to 605 where the player may continue to play the base game. If the player subsequently triggers another bonus game, the subsequent bonus game will start with the retained bonus condition (at 635 and 645), i.e., with the matrix 330 populated with the previously collected configurable symbols. In some embodiments, the gaming device 200 may provide an enhanced payout when the matrix 330 is completely filled with configurable symbols. For example, in some embodiments, the gaming device 200 may award a credit multiplier, e.g., a 3× multiplier, or one of the jackpots, such as the Grand jackpot, for completely filling the matrix 330 with configurable symbols. Accordingly, a player may elect to retain held symbols collected during a first play of the bonus game with the hope of filling out the matrix 330 during a subsequent triggering of the bonus game. In some embodiments, the player may forfeit any banked credits (or other prizes) won during a first play of the bonus game if he/she fails to trigger another bonus game.

Figure 5J:
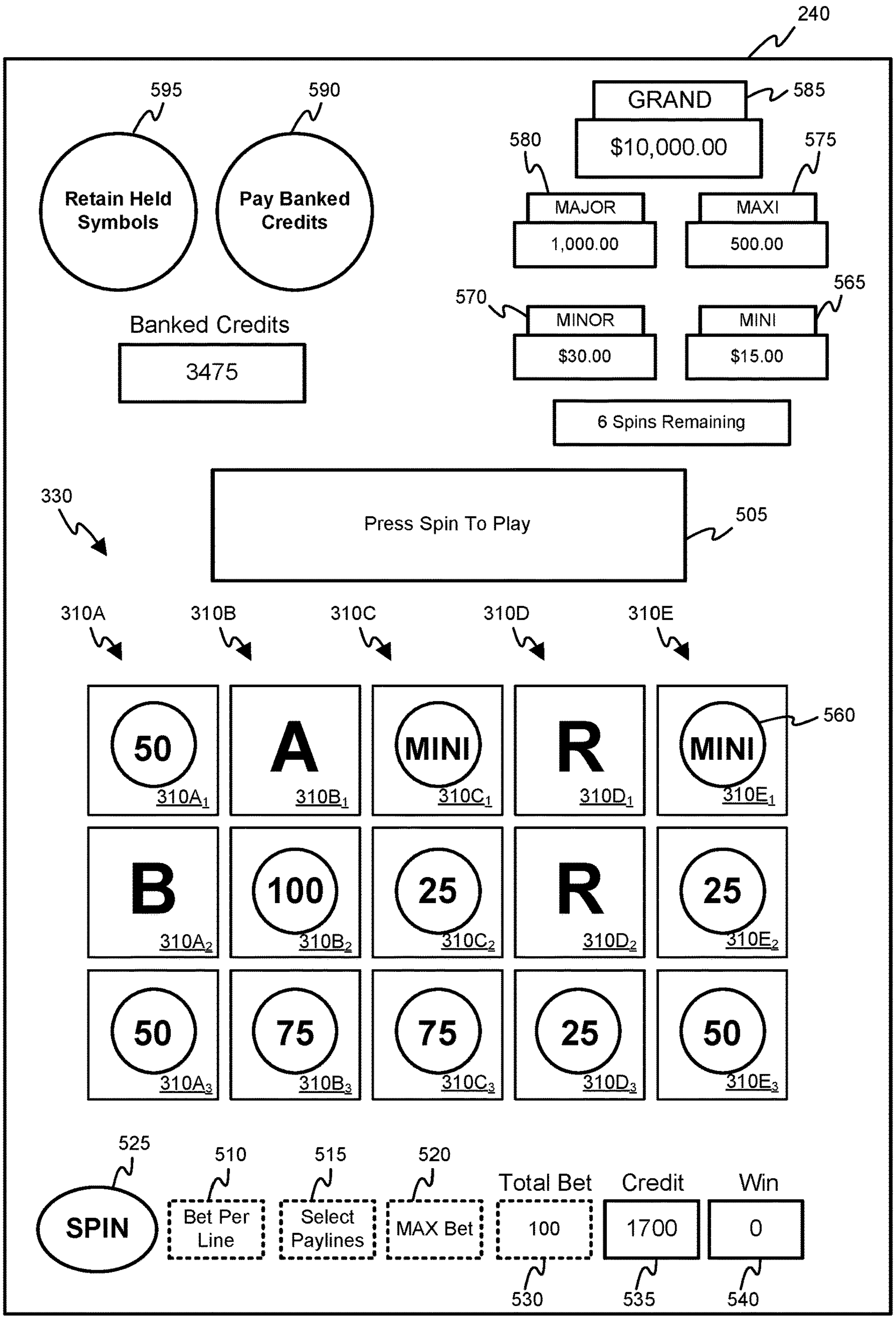

FIG. 5J is a screen shot of the display at the start of a second bonus game in an instance where the player elected to retain the held symbols from the prior bonus game outcome (of FIG. 5I). As shown, the symbol matrix 330 is populated with the held symbols that were won during the prior bonus game and the corresponding accumulated credits are displayed on the Banked Credit meter 505.

In some embodiments, one or more retained bonus conditions may be displayed by the gaming device 200, e.g., during play of the base game, between plays of the base game, and/or when the game is idle. For example, in some embodiments, the base game may be displayed on a primary game display 240, while any retained bonus condition(s) may be displayed on a secondary game display 242.

In an embodiment where the bonus game is a hold & spin game as described above, the secondary game display 240 may display, for example, a matrix of the held symbols and the amount of banked credits that were retained from a prior play of the bonus game.

In some embodiments, the gaming device 200 may be configured to automatically display any retained bonus conditions, e.g., on the secondary game display 242. In other embodiments, the device 200 may be configured to allow the player to "peek" at one or more of the retained bonus conditions, e.g., by pressing a button in the bank of buttons (or on the display) to have one or more retained bonus conditions displayed, e.g. on the primary or secondary game displays 240, 242.

In some embodiments, there may be multiple retained bonus conditions. For example, different bet levels may each have a respective retained bonus game condition/state, e.g., a configuration of held symbols or persistent wilds. If multiple retained bonus conditions exist, they may, for example, be simultaneously or sequentially displayed to the player, e.g., on the secondary game display 242.

In some embodiments, retained bonus conditions may be restricted to the player who earned/achieved the retained bonus condition(s). In other embodiments, retained bonus conditions may be made available to other players, e.g., when the player who earned the retained bonus condition abandons play of the game while a retained bonus condition still exists. In such instances, the retained bonus condition may, for example, be displayed when the game is idle in order to attract prospective players to the machine.

In certain embodiments, retained bonus conditions may only be available for a specified period of time, e.g., 5 minutes, 10 minutes or another time, or a specified number of plays of the base game. The gaming device may display a time remaining (or games remaining) to indicate how much longer a retained condition is available. In instances where multiple retained bonus conditions exist, separate timers (or games remaining) may be displayed for each respective retained bonus condition.

In some embodiments, retained bonus conditions may gradually decay over time. In some embodiments, the retained bonus conditions may decay in the order, or reverse order, they were achieved, e.g., first (or last) achieved sticky wild decays away first. For example, in the context of a hold & spin game, the held symbols in a retained bonus condition may gradually decay (disappear) over time in the order they were achieved, e.g., in FIFO.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A method of a gaming device, the method comprising:

controlling, by a processor of the gaming device for a first play of a bonus game, a display of the gaming device to display one or more bonus game reel spins that present symbols of a first bonus game outcome at bonus game display positions of the display;

after the first play of the bonus game:

storing, by the processor, a bonus game state that includes one or more symbols from the first bonus game outcome; and controlling, by the processor for a play of a base game, the display to display one or more base game reel spins that present symbols of a base game outcome at base game display positions of the display;

after the play of the base game:

retrieving, by the processor, the stored bonus game state; and controlling, by the processor for a second play of the bonus game, the display to populate, per the retrieved bonus game state, the bonus game display positions with the one or more symbols from the first bonus game outcome and display one or more bonus game reel spins that present a second bonus game outcome at the bonus game display positions of the display, wherein the second bonus game outcome comprises at least one symbol held from the one or more symbols from the first bonus game outcome.

2. The method of claim 1, wherein:

the one or more symbols from the first bonus game outcome comprises one or more configurable symbols;

each of the one or more configurable symbols are included in the stored bonus game state; and controlling the display, for the second play of the bonus game, to:

populate each of the one or more configurable symbols from the retrieved bonus game state to a respective bonus game display position; and retain each of the one or more configurable symbols from the retrieved bonus game state at its respective bonus game display position in the second bonus game outcome.

3. The method of claim 1, wherein:

storing the bonus game state comprises including an outcome multiplier from the first play of the bonus game in the stored bonus game state; and conducting the second play of the bonus game using the outcome multiplier of the retrieved bonus game state.

4. The method of claim 1, wherein:

storing all of the one or more symbols of the first bonus game outcome and their respective display positions in the bonus game state; and controlling the display, for the second play of the bonus game, to populate all of the one or more symbols of the retrieved bonus game state to their respective display positions.

5. The method of claim 1, wherein:

controlling the display for the first play of the bonus game comprises:

setting a quantity of games remaining for the first play of the bonus game to an initial quantity;

spinning one of more bonus game reels to present a respective replacement symbol at each bonus game display position without a configurable symbol while holding each configurable symbol at its respective bonus game display position;

reducing the quantity of games remaining; and repeating the spinning, and the reducing until the quantity of games remaining is zero; and storing the bonus game state comprises storing each configurable symbol and its respective display position in the bonus game state in response to a player selection received via one or more input devices of the gaming device.

6. A gaming device, comprising:

a display; and a controller executing instructions stored in a memory, wherein execution of the instructions causes the controller to at least:

control, for a first play of a bonus game, the display to display one or more bonus game reel spins that present symbols of a first bonus game outcome at bonus game display positions of the display;

after the first play of the bonus game:

store a bonus game state that includes one or more symbols from the first bonus game outcome; and control, for a play of a base game, the display to display one or more base game reel spins that present symbols of a base game outcome at base game display positions of the display;

after the play of the base game:

retrieve the stored bonus game state; and control the display to populate, per the retrieved bonus game state, the bonus game display positions with the one or more symbols from the first bonus game outcome and display one or more bonus game reel spins that present a second bonus game outcome at the bonus game display positions of the display, wherein the second bonus game outcome comprises at least one symbol held from the one or more symbols from the first bonus game outcome.

7. The gaming device of claim 6, wherein:

the one or more symbols from the first bonus game outcome comprises one or more persistent function symbols;

each of the one or more persistent function symbols are included in the stored bonus game state; and execution of the instructions causes the controller to control the display, for the second play of the bonus game, such that each of the one or more persistent function symbols from the retrieved bonus state is populated to a respective bonus game display position and retained at its respective bonus game display position in the second bonus game outcome.

8. The gaming device of claim 6, wherein:

the one or more symbols from the bonus game state comprises one or more persistent WILD symbols;

each of the one or more persistent WILD symbols are included in the stored bonus game state; and execution of the instructions causes the controller to control the display, for the second play of the bonus game, such that each of the one or more persistent WILD symbols from the retrieved bonus game state is populated to a respective bonus game display position and retained at its respective bonus game display position in the second bonus game outcome.

9. The gaming device of claim 6, wherein:

the one or more symbols from of the first bonus game outcome comprises one or more configurable symbols;

each of the one or more configurable symbols are included in the stored bonus game state; and execution of the instructions causes the controller to control the display, for the second play of the bonus game, to:

populate each of the one or more configurable symbols from the retrieved bonus game state to a respective bonus game display position; and retain each of the one or more configurable symbols from the retrieved bonus game state at its respective bonus game display position in the second bonus game outcome.

10. The gaming device of claim 6, wherein execution of the instructions causes the controller to:

store all of the one or more symbols of the first bonus game outcome and their respective display positions in the stored bonus game state; and control, for the second play of the bonus game, the display to populate all of the one or more symbols of the retrieved bonus game state to and their respective display positions.

11. The gaming device of claim 6, wherein execution of the instructions causes the controller, for the first play of the bonus game, to:

set a quantity of games remaining for the first play of the bonus game to an initial quantity;

spin one of more bonus game reels to present a respective replacement symbol at each bonus game display position without a configurable symbol while holding each configurable symbol at its respective bonus game display position;

reduce the quantity of games remaining; and repeat, the spinning, and the reducing until the quantity of games remaining is zero; and store each configurable symbol and its respective display position in the stored bonus game state in response to a player selection received via one or more input devices of the gaming device.

12. The gaming device of claim 6, wherein the display comprises one or more display devices.

13. The gaming device of claim 6, wherein execution of the instructions causes the controller to limit availability of the stored bonus game state to a specified period of time.

14. The gaming device of claim 6, wherein execution of the instructions causes the controller to play a specified number of plays of the base game.

15. The gaming device of claim 6, wherein execution of the instructions causes the controller to decay the stored bonus game state over time by removing symbols in an order the symbols were achieved.

16. A non-transitory computer-readable storage medium comprising instructions that in response to being executed causes a gaming device to:

control, for a first play of a bonus game, a display to display one or more bonus game reel spins that present symbols of a first bonus game outcome at bonus game display positions of the display;

after the first play of the bonus game:

store a bonus game state in response to input received via a player interface, wherein the stored bonus game state includes one or more symbols from the first bonus game outcome; and control, for a play of a base game, the display to display one or more base game reel spins that present symbols of a base game outcome at base game display positions of the display;

after the play of the base game:

retrieve the stored bonus game state; and control the display to populate, per the retrieved bonus game state, the bonus game display positions with the one or more symbols from the first bonus game outcome and display one or more bonus game reel spins that present a second bonus game outcome at the bonus game display positions of the display, wherein the second bonus game outcome comprises at least one symbol held from the one or more symbols from the first bonus game outcome.

17. The non-transitory computer-readable storage medium of claim 16, wherein:

the one or more symbols from the first bonus game outcome comprises one or more configurable symbols;

each of the one or more configurable symbols are included in the stored bonus game state; and the instructions, in response to being executed, cause the gaming device to control the display for the second play of the bonus game, to:

populate each of the one or more configurable symbols from the first retrieved bonus game state to a respective bonus game display position; and retain each of the one or more configurable symbols from the retrieved bonus game state at its respective bonus game display position in the second bonus game outcome.

18. The non-transitory computer-readable storage medium of claim 16, wherein the instructions, in response to being executed, causes the gaming device to:

store all of the one or more symbols of the first bonus game outcome and their respective display positions in the bonus game state; and control, for the second play of the bonus game, the display to populate all of the one or more symbols of the retrieved bonus game state to their respective display positions.

19. The non-transitory computer-readable storage medium of claim 16, wherein the instructions, in response to being executed, causes the gaming device, for the first play of the bonus game, to:

set a quantity of games remaining for the first play of the bonus game to an initial quantity;

spin one of more bonus game reels to present a respective replacement symbol at each bonus game display position without a configurable symbol while holding each configurable symbol at its corresponding bonus game display position;

reduce the quantity of games remaining; and repeat the spinning, and the reducing until the quantity of games remaining is zero; and store each configurable symbol and its respective display position in the bonus game state in response to a player selection received via the one or more input devices of the gaming device.

20. The non-transitory computer-readable storage medium of claim 16, wherein the instructions, in response to being executed, causes the gaming device to limit availability of the stored bonus game state to a specified period of time.

* * * * *